United States Patent Office 3,146,590
Patented Sept. 1, 1964

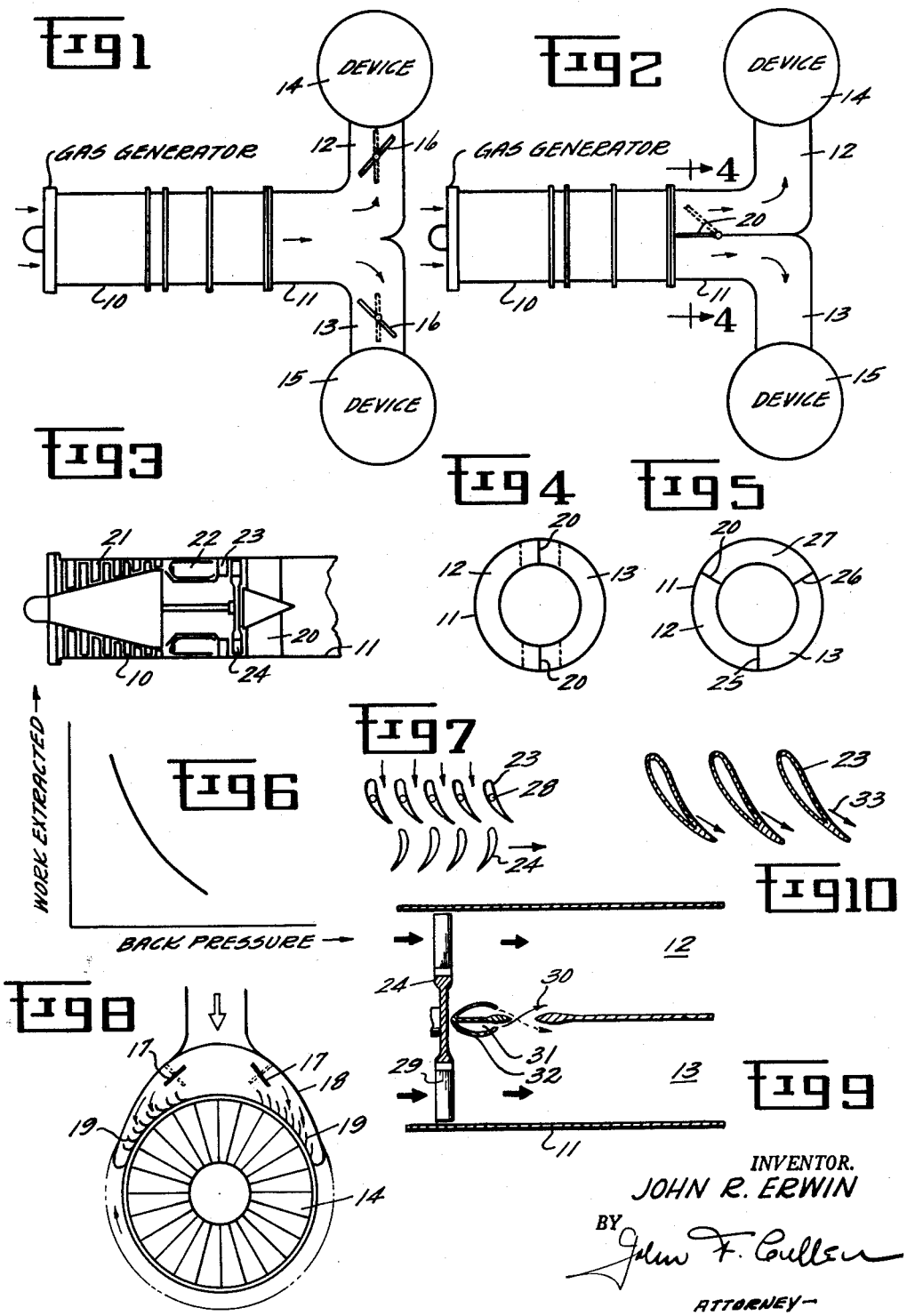

3,146,590
POWER SYSTEM WITH ENERGY
DIVIDING MEANS
John R. Erwin, Cincinnati, Ohio, assignor to General
Electric Company, a corporation of New York
Filed Mar. 12, 1962, Ser. No. 179,001
8 Claims. (Cl. 60—39.17)

The present invention provides a power system with energy dividing means and, more particularly, a power system employing a prime mover and at least two energy using devices adapted to use exhaust gas energy from the prime mover with means for proportionally dividing the mass flow of the output gases of the prime mover between the energy using devices without throttling losses.

The present invention is directed to a power system for control in a VTOL—vertical take-off and landing aircraft—and, for convenience, will be described for such an application. However, it should be appreciated that the invention herein disclosed is applicable to other than such an application and the description with respect to VTOL is merely for the purpose of illustrating the invention.

The use of lift devices aboard a VTOL vehicle for low speed attitude control as well as lift functions requires control of gas flow division between such devices. To provide the control capability without resorting to increased reserve lift or, alternatively, accepting reduced lift during control demand presents a problem. In a typical VTOL power system a gas generator in the form of a gas turbine is provided for producing exhaust gases for thrust. Two or more fans may be used in the wings or fuselage for lift and, typically, the exhaust gas generator is used during lifting by diverting its exhaust to tip turbine fans by means of a diverter valve to thereby provide lift. During horizontal motion the diverter valve permits the exhaust gases to pass rearwardly for propulsive thrust. Such a system is well known and it is such a system that the present invention is designed to improve.

In a typical application employing two fans in the wings of the aircraft it becomes necessary to bank the aircraft in which case it is necessary to control the fan louvers or speed in order to generate the lift but it is also necessary to provide appropriate power to the side of the aircraft which must go up and less power to the side that is intended to go down. Thus, a means of controlling the power from the gas generator to the fan is required. Merely closing louvers on one side and opening them on the other tends to overspeed the fan on one side and lower the speed on the other side creating control problems that are not desirable. The normal way to accomplish this control is to provide throttle valves to permit differential power to the fans. One of the throttles is opened and the other is closed to enable power by throttling. However, this is an inefficient process not only when power is being distributed from one fan to the other but throughout the entire flight conditions since the throttles are always present and cause pressure drop in the flow. In other words, the throttling process involves losses as is well known and a reduction in pressure which represents loss of energy. In addition, it can require more weight in the actuators since the throttling valves are mounted in the hot gas stream and must be able to withstand the temperatures. One way of avoiding the use of throttling valves (in the scroll of the lift fans to reduce the pressure to the tip turbine fan control purposes) is to provide overspeed capability in the fans and more power in the gas generator than is necessary for straight lift.

The main object of the present invention is to provide a power system for such an application to enable differential power distribution without the use of throttling arrangements or overspeed capabilities.

Another object is to provide such a system that permits power distribution for control and trim purposes by providing for differential back pressuring of the prime mover or gas generator.

A further object is to provide such a system wherein energy division is possible without throttling losses or increased power by mechanical or aerodynamic devices that are used to create a differential back pressure on the prime mover.

Briefly stated, my invention illustrated on a VTOL aircraft, employs a gas turbine generator to produce exhaust gases with at least two energy using turbine devices, such as lift fans, having nozzle means to accelerate the gases and duct means interconnecting the gas generator and the lift fans to direct the gases to the lift fans. In this system means are provided to proportionally divide the total mass flow of the exhaust gases to the lift fans by controlling the effective area ratio of the exhaust gas path and this area ratio control is provided by two modifications one of which is a flow divider in the duct adjacent the gas generator and the other a nozzle varying means upstream of the turbine of the gas turbine generator.

While the specification concludes with claims particularly pointing out and distinctly claiming the subject matter which I regard as my invention, it is believed the invention will be better understood from the following description taken in connection with the accompanying drawing in which:

FIGURE 1 is a diagrammatic showing of a conventional lift fan power system;

FIGURE 2 is a diagrammatic showing of the invented power system showing the flow of divider in the duct;

FIGURE 3 shows a gas generator illustrating the flow divider means in the gas generator;

FIGURE 4 is a cross-section on line 4—4 of FIGURE 2;

FIGURE 5 is a cross-section of a flow divider that would be used with more than two lift devices;

FIGURE 6 is a characteristic curve of the prime mover that is used in the power system;

FIGURE 7 is a partial view of a modification of a flow divider employing nozzle varying means upstream of the turbine of the gas generator;

FIGURE 8 is a partial view of a conventional scroll arrangement employing throttling means for power division;

FIGURE 9 is a partial view of a modification of the downstream flow divider using aerodynamic means; and FIGURE 10 is a partial view of a modification of the variable nozzle flow divider using aerodynamic means.

Referring first to FIGURE 1 there is shown a typical lift fan system limited to two lift fans although it will be understood that more fans may be used either in the wings or in the fuselage for lift as well as trim and control purposes. In such a system a gas generator 10 is employed to produce exhaust gases which, during lift, are ducted through duct 11 and branches 12 and 13 to tip turbine fans 14 and 15 of standard and well known construction as generally shown in U.S. Patent 2,973,166. It will be understood that this figure shows the lifting phase only and that gas generator 10, by means of a diverter valve (not shown), can exhaust rearwardly for a forward propulsion in a well known manner. To provide roll control and a roll moment without a loss in total lift from the lift devices 14 and 15 in such a system, the installed gas power available from gas generator 10 must be higher than for simple lift-only use of the lift devices 14 and 15. The increased power is necessary to compensate for continuous throttling losses necessary to system operation. The throttling losses are present because of the use of throttling valves shown diagrammatically at 16 to control the flow to the respective lift fans. In a more detailed fashion the arrangement is shown as applied to one lift fan in FIGURE 8 wherein throttling valves 17 in the scroll 18 control the flow of the exhaust gases to nozzles 19 which in turn direct the exhaust gas to turbine buckets (not shown) on tip turbine lift fan 14 in a well known manner. This is merely an internal showing of the more specific arrangement generally represented in FIGURE 1. A similar arrangement is used on the other side of the scroll as shown in FIGURE 8. Thus, the energy using device or lift fan 14 employs nozzle means 19 to accelerate the gases to the tip turbine fan 14. It can be seen that the use of throttling valve 17 results in energy loss of the gas stream that is driving lift fan 14 because valve 17 is present and is always used to some extent.

The present invention proposes to eliminate the need for the throttling losses by eliminating numerous valves 17 that are used in the conventional system and therefore providing for the maximum use of energy in the exhaust gases. Furthermore, the invented system replaces the throttling valves 17 with fewer parts and provides better results. In the system of the invention it is necessary to use a prime mover that has the characteristic in which a decrease in back pressure affects an increase in the energy extracted from the working fluid. This is a typical characteristic of gas turbines, wave engines, and free piston engines. Such a characteristic is shown in FIGURE 6 wherein as the back pressure is reduced there is an increase in the work extraction per pound of fluid of the exhaust gases. This will be further explained in connection with the instant invention.

Referring next to FIGURE 2, there is provided a system similar to that shown in FIGURE 1 and the same numerals have been applied. However, the throttling valves 16 and 17 are now omitted and replaced by a flow divider 20 which is disposed in the single duct portion 11 ahead of branch portions 12 and 13 and downstream of gas generator 10. Flow divider 20 proportionally divides the total mass flow from gas generator 10 by controlling the area ratio of duct 11 to send different masses of flow to the respective lifting devices 14 and 15.

Referring next to FIGURE 3 a typical gas turbine employing a compressor 21, combustors 22, nozzles 23 and turbine 24 is shown. The position of flow divider 20 with respect to the gas generator is shown and it is disposed adjacent the turbine and downstream thereof. The term "adjacent" is intended to be limited to a spacing wherein the upper end of flow divider 20 is downstream of the turbine no greater a distance than a turbine blade chord length and the purpose of this is to accurately divide the flow between the branches so that no significant leakage across from one branch to the other occurs. A typical diagrammatic mechanical arrangement of flow divider 20 is shown generally in FIGURE 4 wherein the ducts are annular and flow divider 20 may be moved back and forth as shown dotted to provide more area in branch 12 than 13. If more than two lift devices are employed the typical flow divider can take the diagrammatic form shown in FIGURE 5 wherein flow divider 20 may use additional divide members 25 and 26 to change the areas of branches 12 and 13 and an additional branch 27. It can be seen that movement of members 20, 25 and 26 change the respective areas of 12, 13 and 27 which are annular chambers leading to suitable separate ducts not shown but in the same arrangement as shown in FIGURE 4.

To illustrate the energy division of the arrangement shown in FIGURE 2 employing flow divider 20 downstream of and adjacent the turbine 24 of the gas generator, an example will be given.

Referring to FIGURE 2 it will be assumed that conditions require more power to fan 15 and less power to fan 14. It will be appreciated that the internal structure of members 14 and 15 is like that shown in FIGURE 8 without throttling valve 17. Conventional turbine nozzles 19 are fixed or nonmovable and thus present a fixed cross-sectional area to the tip turbine buckets on fan 14. When flow divider 20 is moved to the dotted position shown in FIGURE 2 the flow from gas generator 10 is proportionally divided between branches 12 and 13 with more of the total mass flow entering branch 13. Because of fixed turbine nozzles 19 this means that more flow must squeeze through the fixed area of nozzles 19. Consequently, the pressure in branch 13 increases. By this pressure increase in branch 13 or back pressure on the turbine the pressure difference across the turbine in gas generator 10 on that portion feeding branch 13 is reduced. When the pressure difference (because of the increased back pressure in branch 13) is reduced, less work is extracted from the gas by the turbine in gas generator 10 and the temperature downstream of the turbine in branch 13 is thus higher. Because the turbine is extracting less of the kinetic energy of the gas passing into branch 13, more total energy remains in the gas in branch 13 with the result that more flow at a higher total pressure and higher total temperature is directed to fan 15. This is the condition that is desired for more power in fan 15 and has been accomplished without any throttling losses since no throttling takes place. The reverse is true on fan 14. By cutting down the mass flow to branch 12 the same fixed area nozzle is present in the lift fan 14 so that less pressure is required to drive that flow through the nozzle. Consequently, the pressure in branch 12 drops resulting in a reduced back pressure on the turbine and an increase in pressure differential across the turbine in gas generator 10 in that portion feeding branch 12. More energy is extracted by the turbine from the flow entering branch 12 resulting in a lower temperature of the gas in branch 12 and therefore lower power to fan 14 which again is the condition desired and is obtained without throttling losses.

Thus, the pressure in branch 13 downstream of the turbine is higher than the pressure in branch 12 resulting in a differential back pressure on the turbine.

A modification for obtaining the same results may be used by varying the nozzle upstream of the turbine in the gas generator 10 and this is diagrammatically illustrated in FIGURE 7 wherein the nozzles 23 of the turbine in gas generator 10 are pivoted on pivot means 28 for rotation to cut down the area of the turbine nozzle. Turbine buckets 29 on turbine 24 are, in FIG. 9, diagrammatically shown also. It will be appreciated that using the modification of FIGURE 7 avoids the necessity of the flow divider 20 and is a substitute for it to achieve the same results. With the FIGURE 7 modification the operation of the device is the same. Assume again that fan 15 is to receive more power and fan 14 less power. By opening nozzles 23 in FIGURE 7 in that portion of the annulus feeding branch 13 the flow is again divided proportionally to provide more flow to the fixed nozzles 19 (FIGURE 8) in fan 15 with more flow to branch 13. There is then a higher static pressure in branch 13 and a smaller pressure differential across the turbine of gas generator 10. With this lower pressure differential across the turbine of the gas generator, less work is extracted from the exhaust gases resulting in a higher temperature gas available in branch 13. This then, provides higher pressure, higher temperature and more flow and thus more power to fan 15 which is the condition desired. The reverse is true for fan 14. Upon opening nozzles 23 in FIGURE 7 for branch 13, the corresponding nozzles 23 feeding that annulus of the turbine directed to branch 12 would be closed down. This results in lower mass flow through the fixed nozzles in fan 14 and thus to branch 12 and a lower static pressure in branch 12. The lower pressure results in a larger pressure differential across the turbine of gas generator 10 so more work is extracted from the exhaust gases resulting in a lower temperature of the gas in branch 12 with the result that the gas in branch 12 is at lower pressure, lower temperature, and less flow resulting in less power to fan 14. Thus, the same result of power division by differential back pressuring of the turbine is accomplished by the use of variable nozzles upstream of the turbine in the gas turbine generator 10 without any throttling losses.

While mechanical means have been shown in both modifications for the downstream flow divider and the upstream nozzle varying means it is also possible in this system to employ aerodynamic means and FIGURE 9 schematically illustrates such an arrangement. This permits the same results with no moveable parts and FIGURE 9 is intended merely to be illustrative of how this might be done. The figure shows how the exhaust from turbine 24 may be proportionally divided by using jet deflection in place of flow divider 20. This can comprise a suitable jet of high pressure fluid 30 directed by suitable admission of fluid from one chamber 31 of an airfoil or cone member 32 adjacent the turbine to divide the flow for less flow to branch 12 as shown and more flow to branch 13. Thus, this modification acts exactly as flow divider 20 without the moveable hardware of divider 20. Similarly, the nozzle varying means of FIGS. 3 and 7 of the upstream turbine may employ jets 33 of high pressure fluid as shown in FIGURE 10 to control the cross-sectional area between nozzle vanes 23 without any rotation of the individual nozzle vanes. Thus, the non-moveable structure of FIG. 10 replaces the moveable hardware of FIG. 7 in the FIG. 3 arrangement. While this is a somewhat general showing it is believed to be perfectly clear that aerodynamic means may be used for the area variation in the two modifications shown and only the general showing is required. For example, directing fluid jet 30 in FIG. 9 has the same effect as moving flow divider 20 to the dotted position in FIG. 2. Similarly, increasing the flow of jets 33 in FIG. 10 tends to reduce the nozzle area between the vanes 23 in the same manner as rotation of the vanes about pivot 28 in FIG. 7 reduces the area.

The invention has been described particularly in reference to a VTOL power system but it should be appreciated that the energy division and means of carrying it out is not limited to such application and that the turbine means of fans 14 and 15 could equally be turbines driving electric generators for power generation. The system is only limited to having a prime mover with the characteristics shown in FIGURE 6 which, as has been pointed out, applies to several types of prime movers. Thus, gas generator 10 might also be a wave engine since it has the characteristic of a change in work extraction resulting from a change in back pressure.

While I have hereinbefore described preferred forms of my invention, obviously many modifications and variations of the present invention are possible in the light of the above teachings. It is therefore to be understood that within the scope of the appended claims, the invention may be practiced otherwise than as specifically described.

I claim:

1. A power system having a prime mover in which a decrease in back pressure effects an increase in the energy extracted from the working fluid, said prime mover producing exhaust gases,
   at least two energy using devices with nozzle means to accelerate the gases,
   duct means connecting the prime mover and said devices to direct the gases to said devices,
   means to proportionally divide the total mass flow of exhaust gases to said devices,
   said means including a mechanism for controlling the effective area ratio of the exhaust gas paths to change the back pressure differentially on said prime mover.

2. Apparatus as described in claim 1 wherein the mechanism for controlling the effective area ratio is,
   a flow divider disposed adjacent the prime mover in said duct means.

3. A power system having a gas turbine generator to produce exhaust gases,
   at least two energy using turbine devices with nozzle means to accelerate the gases,
   duct means connecting the generator and said devices to direct the gases to said devices,
   means to proportionally divide the total mass flow of exhaust gases to said devices,
   said means including a mechanism for controlling the effective area ratio of the exhaust gas paths to change the back pressure differentially on said turbine generator.

4. Apparatus as described in claim 3 wherein the mechanism for controlling the effective area ratio is,
   a flow divider disposed in said duct means adjacent and downstream of the turbine of said gas turbine generator.

5. Apparatus as described in claim 3 wherein the mechanism for controlling the effective area ratio is,
   a nozzle varying means upstream of the turbine in said gas turbine generator.

6. A power system having a gas turbine exhaust gas generator,
   at least two tip turbine fans adapted to be driven by the exhaust gases of said generator,
   a single duct connecting said gas generator and having branches to said fans to direct the exhaust gases to said fans,
   means to proportionally divide the total mass flow of exhaust gases to said fans,
   said means including a mechanism for controlling the effective area ratio of the exhaust gas paths through said duct means to change the back pressure differentially on said turbine generator.

7. Apparatus as described in claim 6 wherein the mechanism for controlling the effective area ratio is,
   a flow divider in the single duct portion disposed adjacent and downstream of the turbine of said gas generator.

8. Apparatus as described in claim 6 wherein the mechanism for controlling the effective area ratio is,
   a nozzle varying means upstream of the turbine in said gas turbine generator.

References Cited in the file of this patent

UNITED STATES PATENTS

| | | |
|---|---|---|
| 2,470,348 | Height | May 17, 1949 |
| 2,650,666 | Dorand et al. | Sept. 1, 1953 |
| 2,693,674 | Anxionnaz et al. | Nov. 9, 1954 |
| 2,793,493 | Kadosch et al. | May 28, 1957 |
| 2,825,204 | Kadosch et al. | Mar. 4, 1958 |
| 2,825,532 | Kadosch et al. | Mar. 4, 1958 |
| 2,862,357 | Haworth et al. | Dec. 2, 1958 |
| 2,931,173 | Schapker | Apr. 5, 1960 |
| 2,973,166 | Stahmer | Feb. 28, 1961 |
| 3,044,262 | Chadwick et al. | July 17, 1962 |